United States Patent
Longest et al.

(10) Patent No.: US 10,888,108 B2
(45) Date of Patent: Jan. 12, 2021

(54) SLIDE MEASURING SYSTEM FOR FILLING POUCHES AND ASSOCIATED METHOD

(71) Applicant: Altria Client Services LLC, Richmond, VA (US)

(72) Inventors: Herbert C. Longest, Midlothian, VA (US); Jarrod W. Chalkley, Mechanicsville, VA (US); Tamika S. Murrell, Richmond, VA (US); Jeremy J. Straight, Midlothian, VA (US); Travis M. Garthaffner, Midlothian, VA (US); Leah A. Meyers, Midlothian, VA (US); James D. Evans, Chesterfield, VA (US)

(73) Assignee: Altria Client Services LLC, Richmond, VA (US)

(*) Notice: Subject to any disclaimer, the term of this patent is extended or adjusted under 35 U.S.C. 154(b) by 546 days.

(21) Appl. No.: 15/224,186

(22) Filed: Jul. 29, 2016

(65) Prior Publication Data
US 2017/0029142 A1 Feb. 2, 2017

Related U.S. Application Data

(60) Provisional application No. 62/199,110, filed on Jul. 30, 2015.

(51) Int. Cl.
*B65B 1/32* (2006.01)
*A24B 3/06* (2006.01)
(Continued)

(52) U.S. Cl.
CPC .............. *A24B 3/06* (2013.01); *A24F 23/02* (2013.01); *B65B 1/16* (2013.01); *B65B 1/36* (2013.01);
(Continued)

(58) Field of Classification Search
CPC ... B65B 2210/10; B65B 57/145; B65B 57/10; B65B 37/14; B65B 37/04; B65B 29/00;
(Continued)

(56) References Cited

U.S. PATENT DOCUMENTS 1,311,955 A 8/1919 Edison
1,682,017 A 8/1928 Muller
(Continued)

FOREIGN PATENT DOCUMENTS

WO WO-8302434 A1 7/1983

OTHER PUBLICATIONS

International Search Report for Application No. PCT/US2016/044826 dated Jul. 25, 2018.
(Continued)

*Primary Examiner* — Robert F Long
*Assistant Examiner* — Xavier A Madison
(74) *Attorney, Agent, or Firm* — Harness, Dickey & Pierce, P.L.C.

(57) ABSTRACT

Systems and methods for measuring tobacco for packaging in pouches are disclosed. A system includes a hopper structured and arranged to hold a granular material in a hopper cavity. The system also includes a measuring system including a measuring cavity and a tube that is slidable in the hopper cavity between a first position unaligned with the measuring cavity and a second position over and aligned with the measuring cavity. The measuring system is configured to continuously communicate a vacuum to the measuring cavity. The measuring system is configured to move a portion of the granular material from the hopper cavity to the measuring cavity when the tube is in the first position. The measuring system is configured to move the portion of the granular material from the measuring cavity to a pouch
(Continued)

making machine using pressurized gas that overcomes the vacuum when the tube is in the second position.

19 Claims, 12 Drawing Sheets

(51) Int. Cl.
| | |
|---|---|
| *B65B 57/10* | (2006.01) |
| *A24F 23/02* | (2006.01) |
| *B65B 1/16* | (2006.01) |
| *B65B 9/00* | (2006.01) |
| *B65B 1/36* | (2006.01) |
| *G01F 11/40* | (2006.01) |
| *B65B 29/00* | (2006.01) |
| *B65B 1/46* | (2006.01) |
| *B65B 37/14* | (2006.01) |

(52) U.S. Cl.
CPC .............. *B65B 1/46* (2013.01); *B65B 29/00* (2013.01); *B65B 57/10* (2013.01); *G01F 11/40* (2013.01); *B65B 37/14* (2013.01); *B65B 2210/10* (2013.01); *B65B 2220/18* (2013.01)

(58) Field of Classification Search
CPC .... B65B 1/36; B65B 1/16; B65B 1/32; G01F 11/40; A24F 23/02; A24B 3/06
USPC .......................................................... 53/428
See application file for complete search history.

(56) References Cited

U.S. PATENT DOCUMENTS

| | | | |
|---|---|---|---|
| 1,956,925 A | 5/1934 | Legg | |
| 2,062,438 A | 12/1936 | Baker | |
| 2,783,888 A | 3/1957 | Dahlstrom et al. | |
| 2,862,529 A | 12/1958 | Rosenblatt et al. | |
| 2,933,220 A | 4/1960 | Harker | |
| 3,463,098 A | 8/1969 | Gyde et al. | |
| 3,484,813 A | 12/1969 | Davies | |
| 3,565,297 A | 2/1971 | Bladt et al. | |
| 3,726,622 A * | 4/1973 | DeTroyer | B30B 11/10 425/78 |
| 3,727,755 A | 4/1973 | Cristiani | |
| 3,892,245 A | 7/1975 | Asbill, Jr. | |
| 4,111,212 A | 9/1978 | Bakker | |
| 4,390,029 A | 6/1983 | Leckband et al. | |
| 4,481,753 A | 11/1984 | Rutter et al. | |
| 4,582,101 A | 4/1986 | Graffin | |
| 4,583,571 A | 4/1986 | Focke et al. | |
| 4,640,322 A | 2/1987 | Ballester | |
| 4,698,953 A | 10/1987 | Esch et al. | |
| 4,726,715 A | 2/1988 | Steen et al. | |
| 4,733,803 A | 3/1988 | Sisson et al. | |
| 4,949,766 A | 8/1990 | Coatsworth | |
| 5,010,929 A | 4/1991 | Tisma | |
| 6,145,709 A | 11/2000 | Hogan et al. | |
| 6,305,552 B1 | 10/2001 | Coleman | |
| 6,394,098 B1 | 5/2002 | Cunningham | |
| 6,431,407 B1 | 8/2002 | Hogan et al. | |
| 6,516,810 B1 | 2/2003 | Haul | |
| 6,774,318 B2 | 8/2004 | Beal et al. | |
| 6,840,248 B2 | 1/2005 | Zielke | |
| 7,584,758 B2 | 9/2009 | Focke et al. | |
| 7,849,891 B2 | 12/2010 | Hashiba et al. | |
| 8,074,428 B2 | 12/2011 | Hoppe et al. | |
| 10,399,712 B2 * | 9/2019 | Longest, Jr. | B65B 1/36 |
| 2003/0205034 A1 | 11/2003 | Sus et al. | |
| 2007/0284012 A1 | 12/2007 | Smith et al. | |
| 2008/0202532 A1 | 8/2008 | Wygal | |
| 2008/0236701 A1 * | 10/2008 | Monti | B65B 1/36 141/5 |
| 2008/0264432 A1 | 10/2008 | Moser et al. | |
| 2009/0001101 A1 * | 1/2009 | Zahradka | B65B 1/36 222/228 |
| 2010/0101189 A1 | 4/2010 | Boldrini | |
| 2011/0108157 A1 | 5/2011 | Scharger | |
| 2011/0230320 A1 | 9/2011 | Stokes et al. | |
| 2011/0277878 A1 | 11/2011 | Williams | |
| 2011/0289887 A1 | 12/2011 | Garthaffner et al. | |
| 2011/0303511 A1 | 12/2011 | Brinkley et al. | |
| 2012/0000165 A1 | 1/2012 | Williams | |
| 2012/0060446 A1 | 3/2012 | Merz | |
| 2014/0007978 A1 | 1/2014 | Cheikh et al. | |
| 2014/0157728 A1 | 6/2014 | Williams | |
| 2015/0183532 A1 | 7/2015 | Longest, Jr. et al. | |

OTHER PUBLICATIONS

International Preliminary Report for Application No. PCT/US2016/044826 dated Jan. 30, 2018.
U.S. Appl. No. 14/584,668, filed Dec. 29, 2014.
U.S. Notice of Allowance for U.S. Appl. No. 14/584,668 dated Apr. 17, 2019.

* cited by examiner

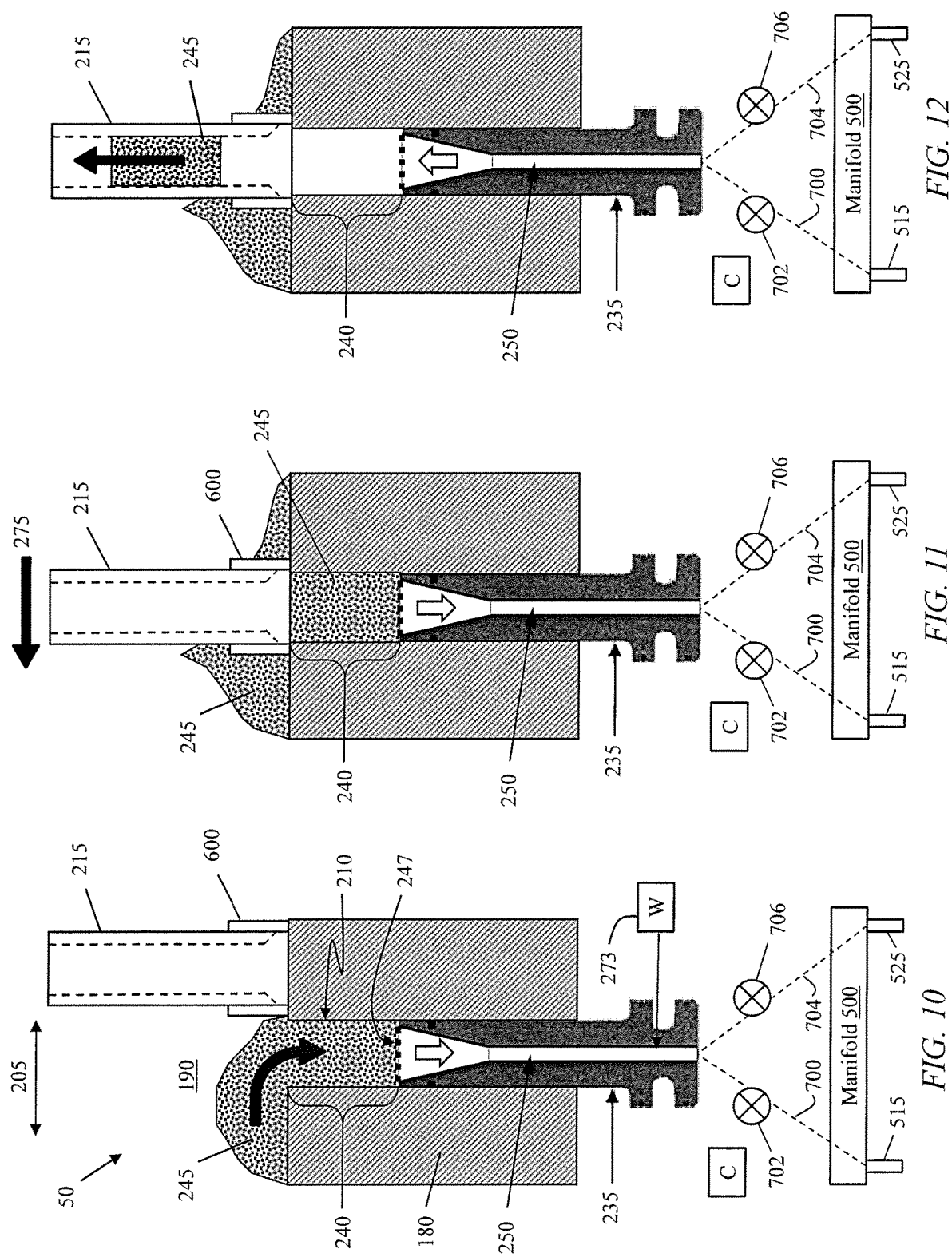

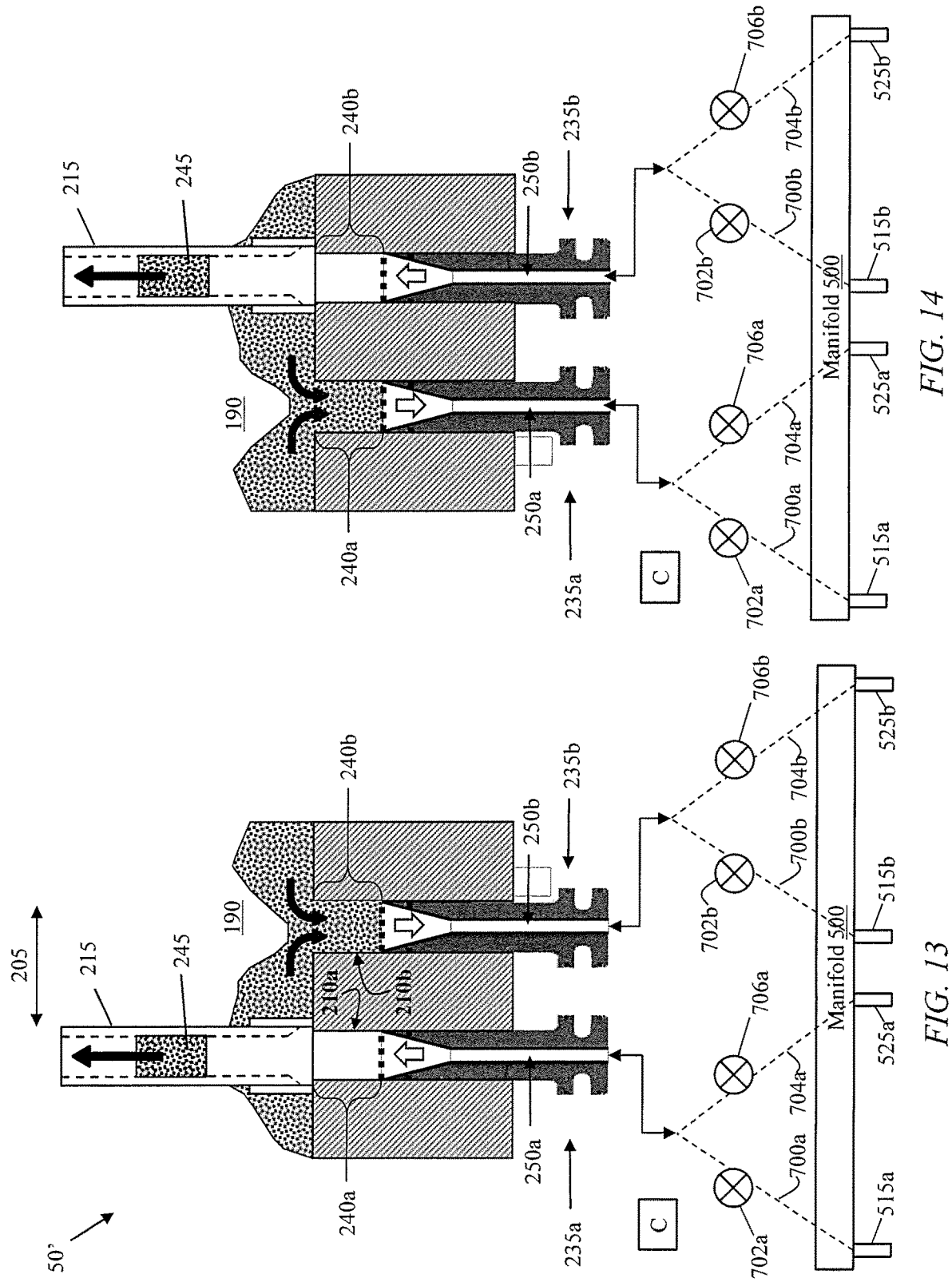

SLIDE MEASURING SYSTEM FOR FILLING POUCHES AND ASSOCIATED METHOD

This patent application claims priority to U.S. Provisional Application Ser. No. 62/199,110, filed on Jul. 30, 2015, the contents of which are hereby incorporated by reference in their entirety.

FIELD

This disclosure relates generally to systems and methods for filling pouches with granular material and, more particularly, to providing measured portions of smokeless tobacco to a pouch making machine in a continuous operation.

SUMMARY

Smokeless tobacco, such as dipping tobacco, snus, etc., is commonly packaged in pouches that are provided to the consumer in a lidded cylindrical container (e.g., a can). Each pouch may include an amount of tobacco contained in a paper case.

In accordance with aspects disclosed herein, there is a system and method for measuring tobacco for packaging in pouches. A system includes a hopper structured and arranged to hold a granular material in a hopper cavity. The system also includes a measuring system including a measuring cavity and a tube that is slidable in the hopper cavity between a first position unaligned with the measuring cavity and a second position over and aligned with the measuring cavity. The measuring system is structured and arranged to continuously communicate a vacuum to the measuring cavity. The measuring system is structured and arranged to move a portion of the granular material from the hopper cavity to the measuring cavity when the tube is in the first position. The measuring system is structured and arranged to move the portion of the granular material from the measuring cavity to a pouch making machine using pressurized gas that overcomes the vacuum when the tube is in the second position.

According to another aspect, there is a system for measuring tobacco for packaging in pouches. The system includes a hopper structured and arranged to hold a granular material in a hopper cavity. The system also includes a measuring system including: a plurality of measuring cavities; and a plurality of tubes slidable in the hopper cavity. The measuring system is structured and arranged to continuously communicate a vacuum to each of the plurality of measuring cavities. The measuring system is structured and arranged to move the plurality of tubes to a first position that uncovers the plurality of measuring cavities. The measuring system is also structured and arranged to fill the plurality of measuring cavities with respective portions of the granular material using the vacuum while the plurality of tubes are in the first position. The measuring system is additionally structured and arranged to move the plurality of tubes to a second position over and aligned with the plurality of measuring cavities. The measuring system is further structured and arranged to move the respective portions of the granular material from the plurality of measuring cavities to a pouch making machine using pressurized gas that overcomes the vacuum while the plurality of tubes are in the second position.

According to another aspect, there is a method for measuring tobacco for packaging in pouches. The method includes: providing granular material to a sifter using a feeder; sifting the granular material into a hopper; measuring a portion of the granular material in a measuring cavity; moving the portion of the granular material from the measuring cavity to a pouch making machine; and making a pouch encapsulating the portion of granular material. The measuring includes: continuously communicating a vacuum to the measuring cavity; moving a tube to a first position unaligned with the measuring cavity; moving the portion of the granular material into the measuring cavity using the vacuum; and moving the tube to a second position over and aligned with the measuring cavity. The moving the portion of the granular material from the measuring cavity to the pouch making machine includes applying compressed gas to the measuring cavity to overcome the vacuum and move the portion of the granular material through a flowpath extending between the measuring cavity and the pouch making machine.

BRIEF DESCRIPTION OF THE DRAWINGS

Various aspects are further described in the detailed description which follows, in reference to the noted plurality of drawings by way of non-limiting examples of embodiments, in which like reference numerals represent similar parts throughout the several views of the drawings.

FIG. 10 shows additional aspects of the pouch making system, in accordance herewith;

FIG. 11 shows additional aspects of the pouch making system, in accordance herewith;

FIG. 12 shows additional aspects of the pouch making system, in accordance herewith;

FIG. 13 shows additional aspects of the pouch making system, in accordance herewith;

FIG. 14 shows additional aspects of the pouch making system, in accordance herewith;

DETAILED DESCRIPTION

Figure 1:
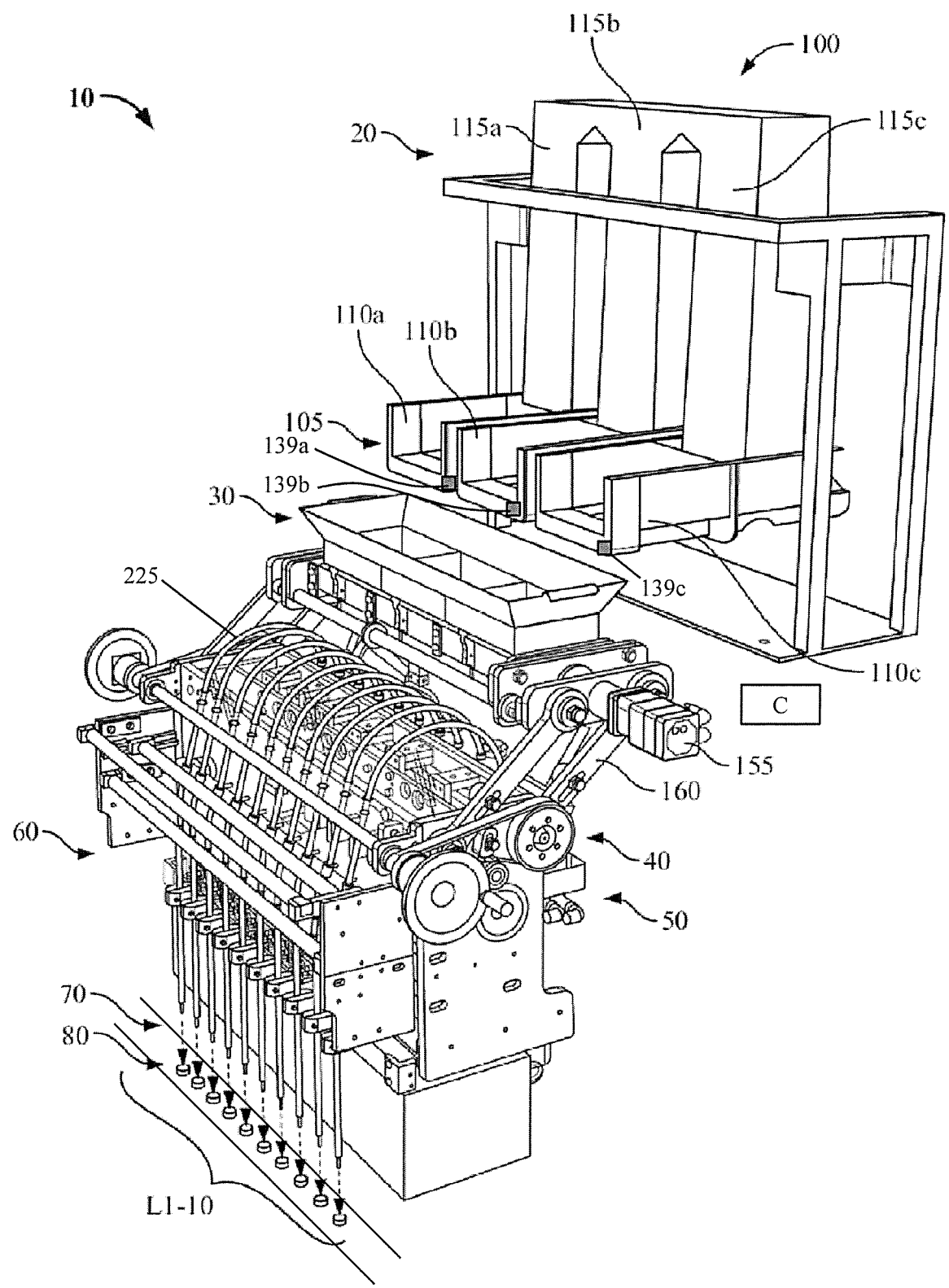
FIG. 1 shows an exemplary pouch making system, in accordance herewith.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-15, wherein like numerals are used to designate like elements throughout.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

This disclosure relates generally to systems and methods for filling pouches with granular material and, more particularly, to providing measured portions of smokeless tobacco to a pouch making machine in a continuous operation. According to aspects disclosed herein, a system includes a measuring system that accurately and consistently measures a volumetric amount of granular material for insertion into a pouch. In embodiments, the measuring system includes a plurality of lanes that measure a plurality of portions of the granular material simultaneously. In aspects described herein, the measuring system is arranged upstream of a pouch making machine and provides the measured portions of granular material to the pouch making machine, which creates respective pouches each containing a measured portion of granular material.

As used herein the terms "adapted" and "configured" or "structured" and "arranged" mean that the element, component, or other subject matter is designed and/or intended to perform a given function. Thus, the use of the terms "adapted" and "configured" or "structured" and "arranged" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

Granular material as used herein may refer to smokeless tobacco, including but not limited to dipping tobacco, snus, etc. However, the invention is not limited to use with tobacco, and other non-tobacco granular material(s) may be used within the scope of the invention.

FIG. 1 shows an exemplary system 10 in accordance herewith. In embodiments, system 10 includes a feeder 20, sifter 30, hopper 40, measuring system 50, and pouch making machine 60. The system 10 may also include a conveyor 70 that moves empty containers (e.g., cans) 80 into position to receive pouches from pouch making machine 60 and that moves containers 80 filled with pouches away from pouch making machine 60. The details of the pouch making machine 60 are not shown. Pouch making machine 60 may include a conventional machine such as, for example, the pouching apparatus manufactured and sold by, for example, Ropak Manufacturing Company, Inc. of Decatur, Ala. and Merz Verpackungsmaschinen GmbH, Lich, Germany.

In an exemplary operation of the system 10, the feeder 20 selectively provides bulk granular material to the sifter 30, which de-clumps the bulk granular material with a sifting operation and provides the sifted granular material to the hopper 40. The hopper 40 collects and holds the sifted granular material adjacent the measuring system 50. The measuring system 50 draws a portion of the granular material from the hopper 40 into a measuring volume, and subsequently moves the measured portion of granular material from the measuring volume to the pouch making machine 60 where the measured portion of granular material is encapsulated in a pouch. The pouch containing the measured portion of granular material may be placed in a container 80. The various aspects of system 10 are described in greater detail herein.

Still referring to FIG. 1, the feeder 20 includes an inlet 100 adapted to receive bulk material and an outlet 105 adapted to pass the bulk material to the sifter 30. The outlet 105 may include a number of pans 110a-c equal to a number of chambers included in the sifter 30. Bulk material may be provided to the inlet 100 in any suitable manner, including manually (e.g., hand scooped, poured from a bag, etc.) and/or automatically (e.g., delivered on a conveyor, etc.). A number of chutes 115a-c equal to the number of pans 110a-c may be used to convey the bulk material from the inlet to the pans 110a-c. The invention is not limited to the three pans and chutes shown, and any number of may be used, including one, two, more than three, etc.

In aspects described herein, the bulk material collects in the pans 110a-c and is selectively moved from the pans 110a-c to the sifter 30 by controllably agitating (e.g., shaking) the feeder 20. For example, the pans 110a-c may be slightly inclined relative to horizontal such that agitating the feeder causes the bulk material to move toward an open end of the pans 110a-c and fall from the pans 110a-c into the sifter 30 by gravity. The agitating is controlled, e.g., selectively turned on and off, to provide a desired amount of bulk material to the sifter 30. The control may be provided by a sensor and/or by a computer-based control program, or the like. The agitating may be provided in any suitable manner, such as with an electric or pneumatic actuator.

Figure 2:
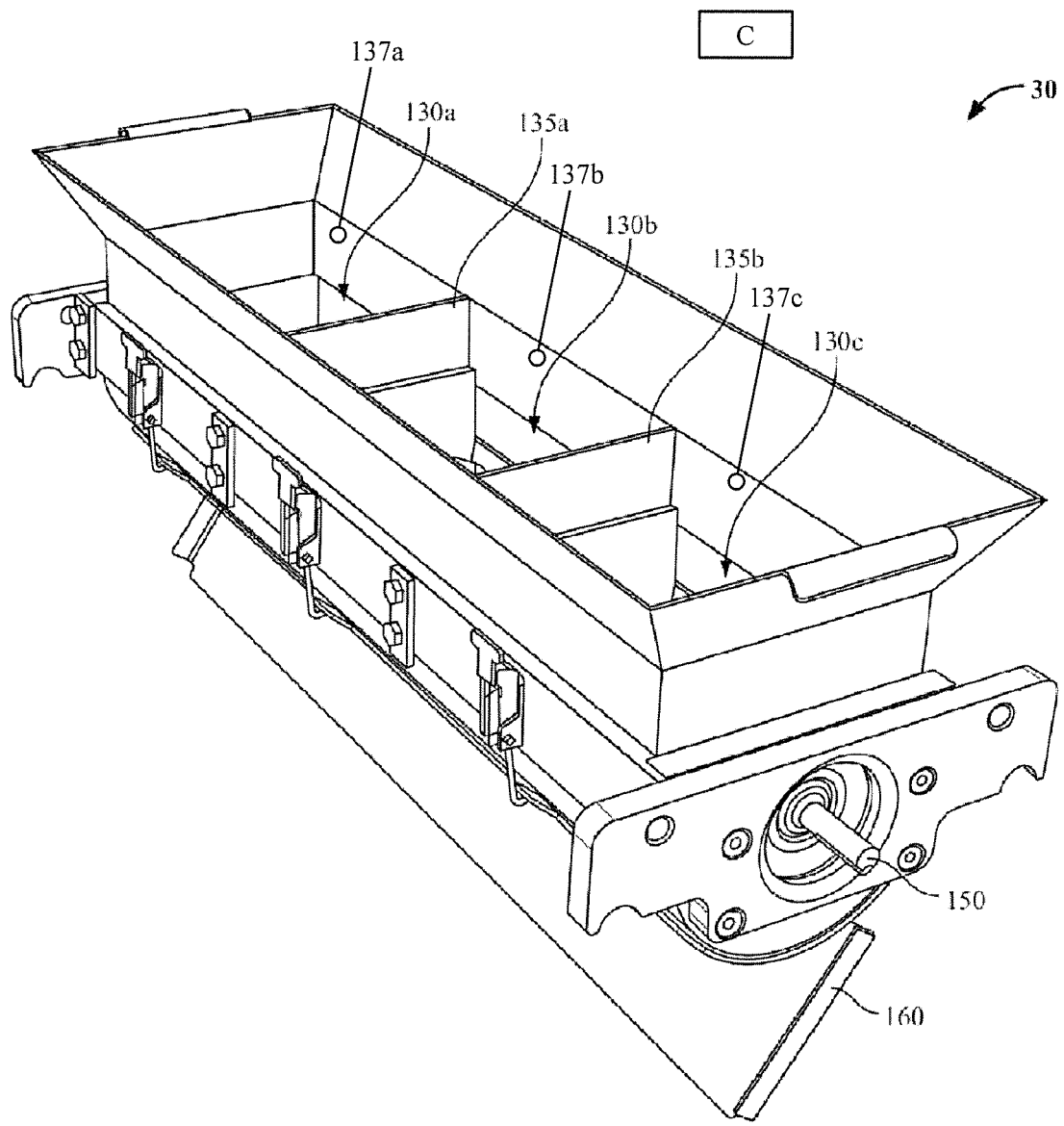
FIG. 2 shows various aspects of the pouch making system, in accordance herewith.
Figure 3:
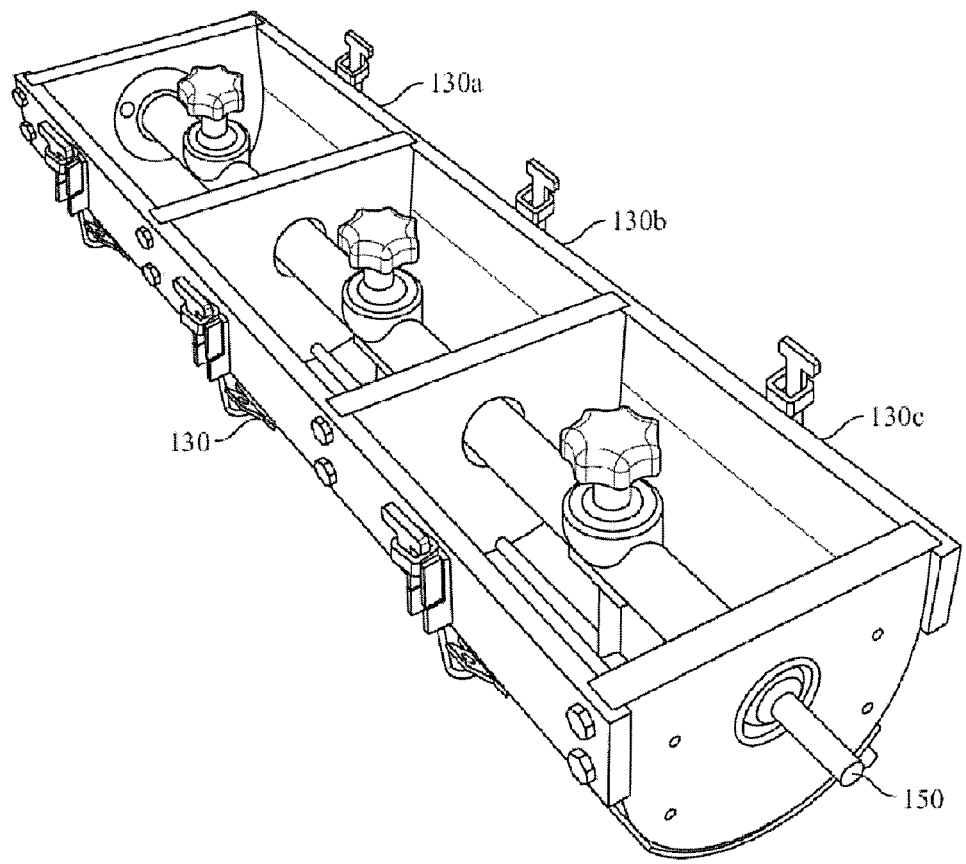
FIG. 3 shows additional aspects of the pouch making system, in accordance herewith.
Figure 4:
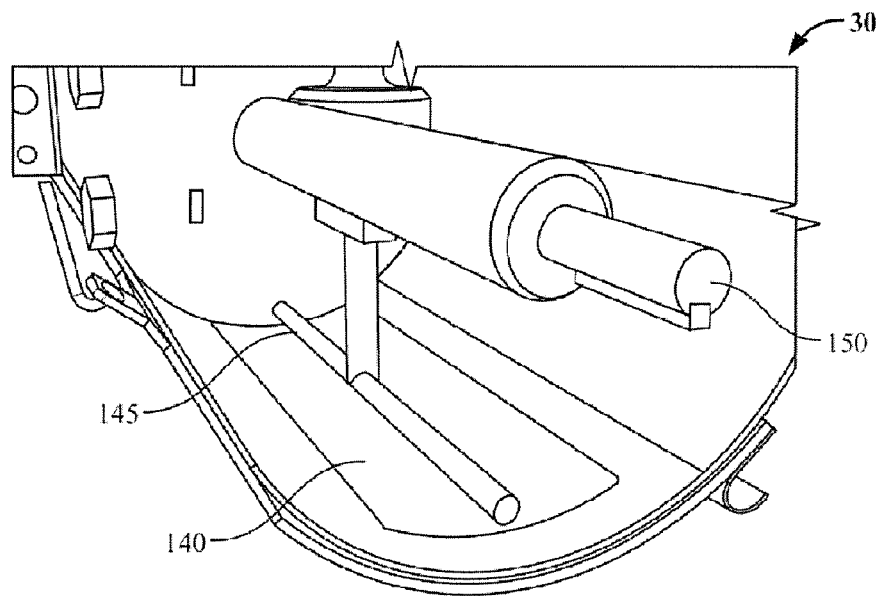
FIG. 4 shows additional aspects of the pouch making system, in accordance herewith.

FIGS. 2-4 show views of an exemplary implementation of sifter 30 in accordance herewith. With specific reference to FIG. 2, sifter 30 may include a number of chambers 130a-c corresponding to the number of pans 110a-c of feeder 20. During operation, chambers 130a-c receive bulk material from feeder 20. Partitions 135a-b may be used to divide the chambers 130a-c. The sifter 30 is described with three chambers 130a-c for illustration purposes but is not limited to this or any other number of chambers. Moreover, the invention is not limited to sifter 30 including a number of chambers equal to the number of pans, and implementations may be used in which sifter 30 has a number of chambers that is different than the number of pans.

In embodiments, each of the chambers 130a-c includes a respective level sensor 137a-c that is configured to detect a level of granular material in the respective chamber. For example, chamber 130a may be provided with a level sensor 137a that detects the level of granular material in chamber 130a. The level sensors 137a-c may comprise any suitable type of level sensor, such as a laser level sensor.

With continued reference to FIGS. 1 and 2, the agitation of each of pans 110a-c in feeder 20 may be individually controlled based on a signal from a respective one of level sensors 137a-c in chambers 130a-c. For example, an amount of agitation applied to pan 110a may be selectively controlled based on a signal from level sensor 137a in chamber 130a. Similarly, an amount of agitation applied to pan 110b may be selectively controlled based on a signal from level sensor 137b in chamber 130b. Similarly, an amount of agitation applied to pan 110c may be selectively controlled based on a signal from level sensor 137c in chamber 130c. In an exemplary implementation, each level sensor 137a-c is operatively connected to a controller "C" that provides respective control signals to respective agitation actuators 139a-c connected to each of the pans 110a-c. In a preferred embodiment, the controller "C" individually controls each agitation actuator 139a-c to be always on and increases or decreases the level of agitation provided by each agitation actuators 139a-c based on a detected level of granular material in a corresponding chamber of the sifter. In this manner, level sensors 137a-c and controller "C" provide analog feedback to the vibratory feed system that feeds granular material into each chamber of the sifter 30. This analog feedback provides increased level accuracy in the chambers of the sifter, which in turn provides enhanced dosing accuracy for filling pouches in pouch making machine 60.

According to aspects described herein, and as shown in FIGS. 3 and 4, each chamber 130a-c includes a screen 140 in a bottom surface of the chamber and a wiper (e.g., agitator) 145 connected to a shaft 150. In embodiments, the shaft 150 extends through all chambers 130a-c and is connected to the respective wiper 145 in each respective chamber, such that the shaft 150 moves all wipers 145 at the same time. The shaft 150 may be driven (e.g., rotated in a reciprocating manner) by any suitable actuator, such as an electric motor 155 as shown in FIG. 1.

As is understood from FIGS. 2-4, sifter 30 operates to sift bulk material that is held in chambers 130a-c through screens 140, with wipers 145 assisting in breaking up the bulk material and/or pushing the bulk material through the screens 140. Tobacco pouch making equipment is sensitive to the composition/characteristics of the tobacco (e.g., bulk material) that is used in pouch production. The ability to control pouch weight consistently at the pouch making equipment is affected by the consistency of the tobacco used. The more consistent the tobacco characteristics are, the better the pouch maker will operate. When sticky/clumpy tobacco is use in the production, pouch weight can be difficult to control. Moreover, when the tobacco is fed from bulk storage containers into the pouch making machinery, it can be difficult to provide consistent material characteristics. Many times, tobacco coming from bulk storage containers is stuck together in clumps.

As described herein, sifter 30 is arranged downstream of bulk material feeder 20 and upstream of pouch making machine 60, and is used to de-clump the granular material in order to provide consistent granular material. In embodiments, sifter 30 forces the granular material to flow through the one or more screens 140, which have a predefined opening dimension. In some aspects, when the granular material does not easily flow through screen 140 by gravity alone, wiper 145 pushes the granular material through the screen 140. The wiper 145 also breaks up clumps of the bulk material, which helps the material pass through screen 140.

Figure 5:
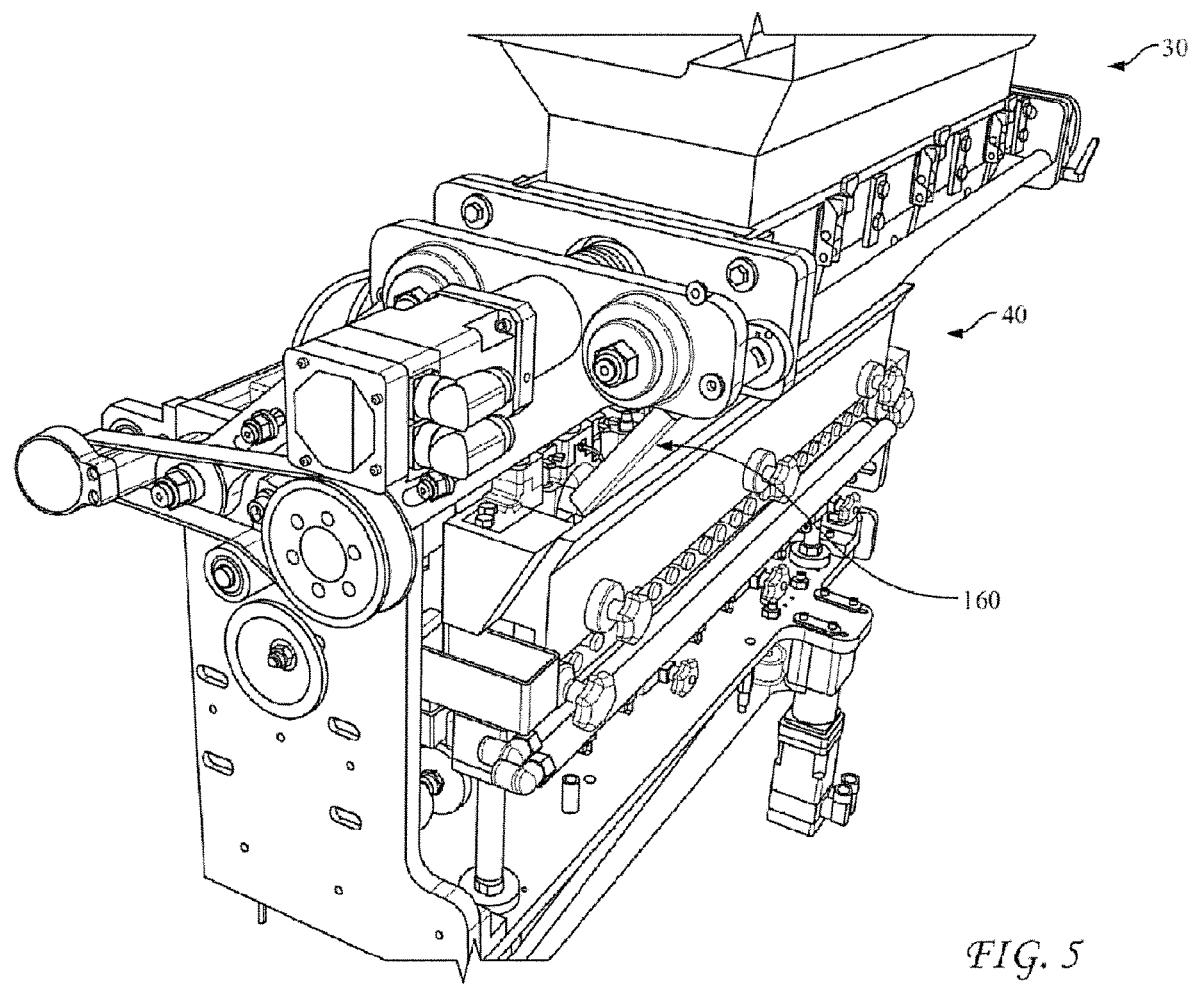
FIG. 5 shows additional aspects of the pouch making system, in accordance herewith.
Figure 7:
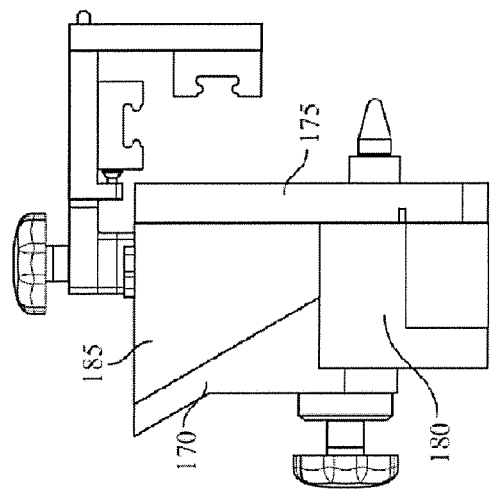
FIG. 7 shows additional aspects of the pouch making system, in accordance herewith.
Figure 6:
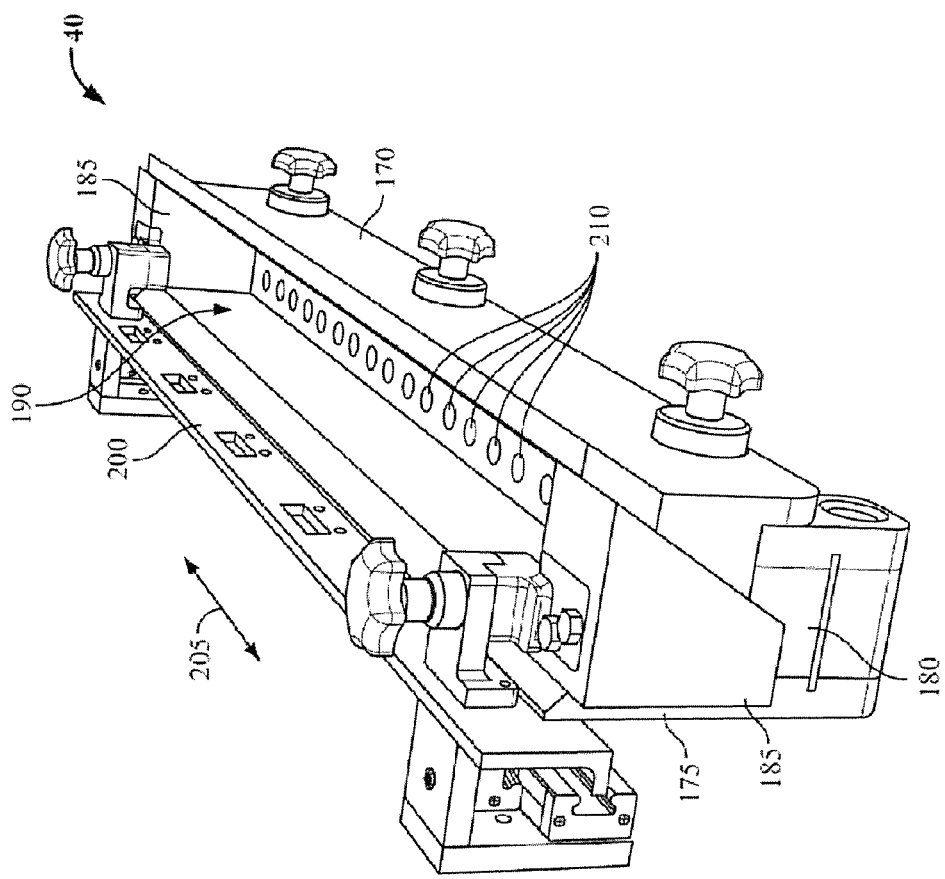
FIG. 6 shows additional aspects of the pouch making system, in accordance herewith.

FIGS. 5-7 show views of an exemplary implementation of hopper 40 in accordance herewith. With specific reference to FIG. 5, hopper 40 is arranged below sifter 30 and receives sifted granular material that has passed through screens 140. A diverter 160, shown in FIGS. 1 and 5, may be used to guide the granular material as it travels by gravity from sifter 30 to hopper 40.

According to aspects described herein, and as shown in FIGS. 6 and 7, hopper 40 includes a front wall 170, back wall 175, bottom plate 180, and end blocks 185 that define a hopper cavity 190 that receives and holds sifted granular material adjacent the measuring system. In embodiments, front wall 170, back wall 175, and bottom plate 180 are stationary, and end blocks 185 are moveable relative to the stationary elements. In one example, end blocks 185 are fixedly connected to a slide 200 that moves transversely, e.g., along arrow 205, and in a reciprocating fashion relative to stationary front wall 170, back wall 175, bottom plate 180. Slide 200 may be moved using any suitable actuator, such as an electric actuator, pneumatic actuator, or the like. The movement of blocks 185 causes movement of the granular material within hopper cavity 190, which prevents accumulation of the granular material at the ends of hopper cavity 190 adjacent the blocks 185. The movement of the granular material within hopper cavity 190 that is caused by moving blocks 185 also assists in moving the granular material over measuring holes 210 in bottom plate 180, as described in greater detail below.

Figure 8:
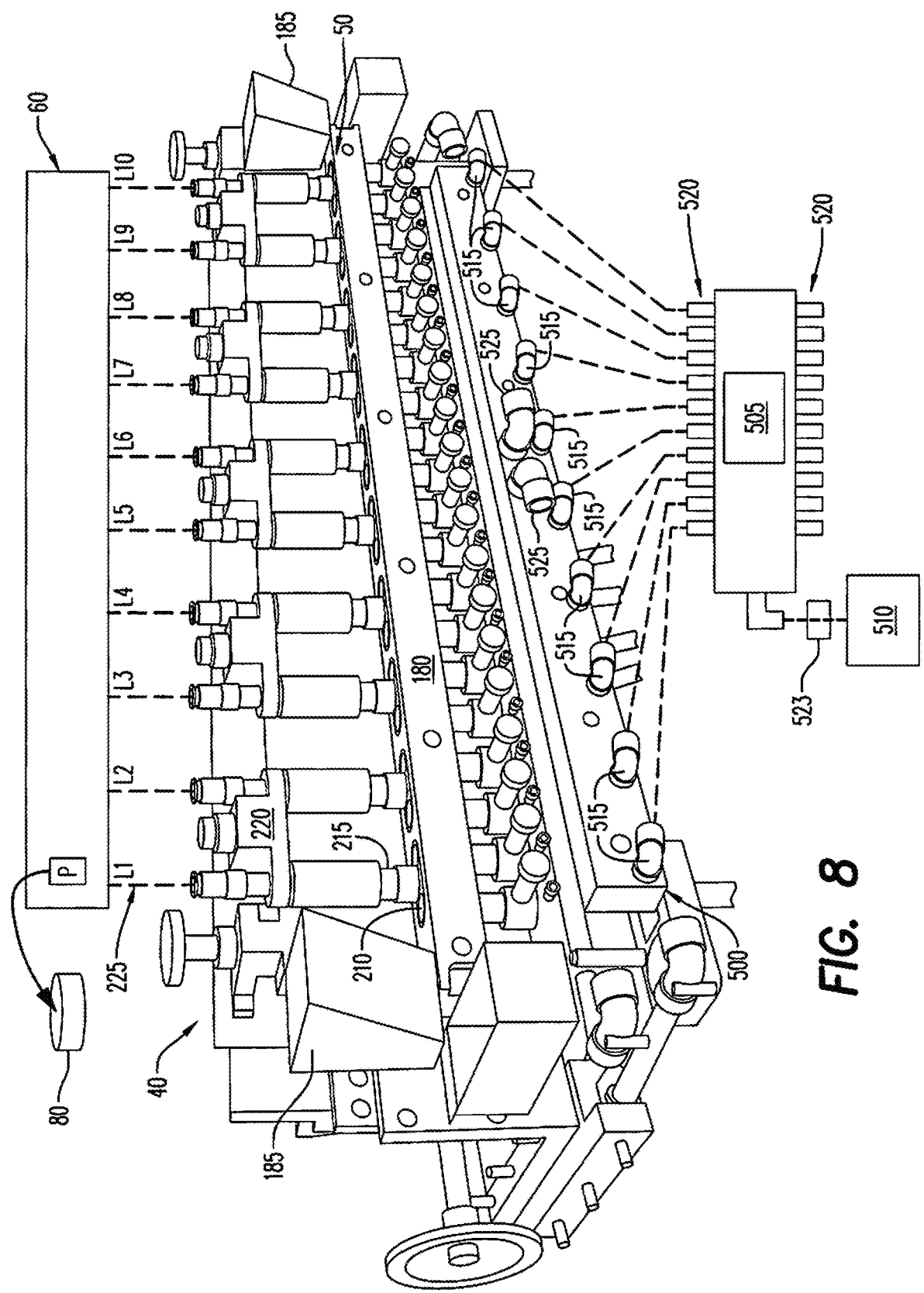
FIG. 8 shows additional aspects of the pouch making system, in accordance herewith.

FIG. 8 shows aspects of an exemplary measuring system 50 as described herein. Although front wall 170 of hopper 40 is omitted from view in FIG. 8 for illustration, it is understood that hopper 40 in FIG. 8 may include the elements shown in FIGS. 6 and 7. In embodiments, bottom plate 180 of hopper 40 includes holes 210 that are structured and arranged to be filled with a volume of granular material from hopper cavity 190 shown in FIG. 6. After one of holes 210 is filled with granular material, a tube 215 is moved over and in precise alignment with the filled hole 210. The tube 215 may be moved by a tube carrier 220 that is connected to slide 200 as described with respect to FIG. 6. A conduit 225 (also shown in FIG. 1) may be connected to one end of tube 215 between tube 215 and pouch making machine 60. In embodiments, when tube 215 is aligned over hole 210, the measured portion of granular material in hole 210 is moved out of hole 210, through tube 215, and through conduit 225 to pouch making machine 60. In aspects, the pouch making machine 60 encapsulates the measured portion of granular material in a pouch "P" (e.g., a paper pouch) and moves (e.g., drops) pouch "P" into a container 80 (also shown in FIG. 1). The filling of hole 210 with granular material may be accomplished using gravity and vacuum, and moving the granular material out of the hole 210 may be accomplished using pressurized gas, as described in greater detail herein. As depicted in FIG. 8, there may be plural holes 210, tubes 215, and conduits 225 associated with a single hopper 40 and/or a single pouch making machine 60.

In embodiments, the measuring system 50 includes five tube carriers 220 each carrying two tubes 215. Each tube 215 is in turn connected to a respective conduit 225, thereby providing ten lanes L1-L10 as shown in FIGS. 1 and 8. Implementations are not limited to these exemplary numbers of tube carries, tubes, and lanes, and any suitable configuration may be used.

Still referring to FIG. 8, in aspects described herein vacuum is communicated to holes 210 in bottom plate 180 by way of a manifold 500, accumulator 505, and vacuum source 510. In embodiments, manifold 500 includes a respective manifold vacuum port 515 fluidically connected to each one of holes 210 of bottom plate 180. Ten manifold vacuum ports 515 are shown in FIG. 8 and ten other manifold vacuum ports 515 are not visible in FIG. 8. In this manner, there are twenty manifold vacuum ports 515 corresponding to the twenty holes 210. The respective fluidic connections between manifold vacuum ports 515 and holes 210 may be provided, for example, by internal passages defined by manifold 500. In embodiments, accumulator 505 includes a respective accumulator vacuum port 520 fluidically connected to each one of manifold vacuum ports 515. The respective fluidic connections between manifold vacuum ports 515 and accumulator vacuum ports 520 may be provided, for example, by plumbing. The accumulator 505 is also fluidically connected to vacuum source 510, e.g., by plumbing. A pressure regulator 523 may be connected inline between accumulator 505 and vacuum source 510. In this manner, vacuum may be provided to the holes 210 for the purpose of drawing granular material into the holes during the measuring, as described in greater detail with respect to FIGS. 10-14.

With continued reference to FIG. 8, in aspects described herein manifold 500 is also provided with at least one port 525 for receiving pressurized gas such as compressed air. In embodiments, the at least one port 525 is fluidically connected to each one of the holes 210 of bottom plate 180, for example, by internal passages defined by manifold 500. In this manner, pressurized gas may be provided to holes 210 for the purpose of expelling the granular material from holes 210 after the measuring, as described in greater detail with respect to FIGS. 10-14.

Figure 9A:
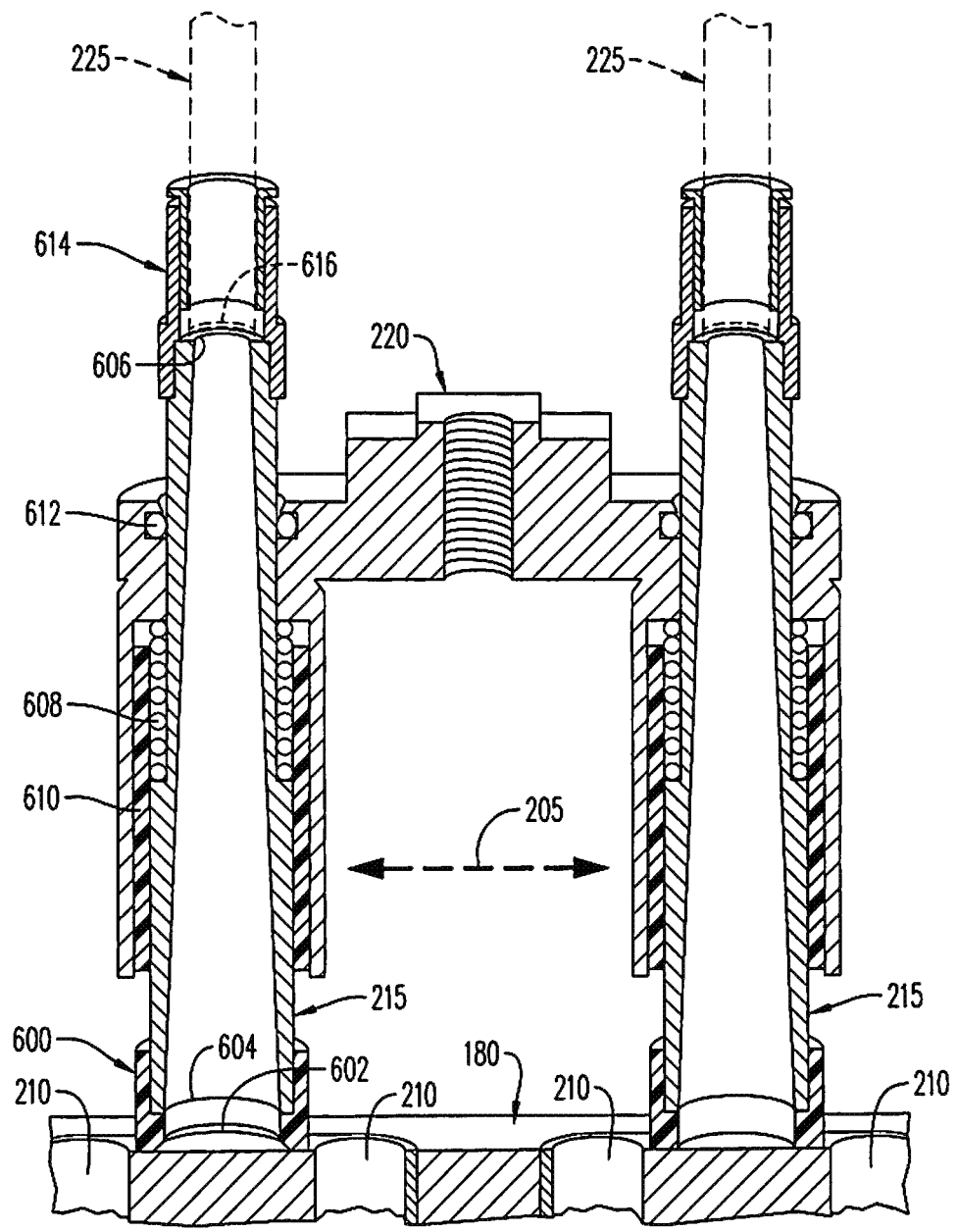
FIGS. 9A and 9B show additional aspects of the pouch making system, in accordance herewith.

FIG. 9A shows a cross section view of an exemplary arrangement of tubes 215, tube carrier 220, and conduits 225 as described herein. In embodiments, a tube carrier 220 holds two tubes 215 and includes hardware (e.g., screw threads and/or clamps, etc.) for connecting to slide 200 shown in FIG. 6 such that tube carrier 220 moves with slide 200 in a reciprocating manner in direction 205. In embodiments, tube carrier 220 is composed of a non-reactive material such as stainless steel. The tube carrier 220 is not limited to the configuration shown in FIG. 9A, and other configurations may be used within the scope of the invention.

As described herein, movement of the tube carrier 220 causes movement of the tubes 215 relative to the stationary bottom plate 180 during the measurement operation. In embodiments, a sacrificial wear element 600 is connected to the bottom end of each tube 215 and is configured to directly contact the top surface of bottom plate 180. The sacrificial wear element 600 may be composed of a material that minimizes damage to bottom plate 180 during the repeated high speed movement of tubes 215 relative to the bottom plate. For example, sacrificial wear element 600 may be composed of polyether ether ketone (PEEK) or other suitable material. The sacrificial wear element 600 may be removed and replaced on an as-needed basis during maintenance of system 10.

In embodiments, a lower end of tube 215 fits inside sacrificial wear element 600 with the nominal inside diameter of sacrificial wear element 600 being the same as the inside diameter of the lower end of tube 215. The lower end of sacrificial wear element 600 may have an internal chamfer 602 such that the inside diameter at the lowermost end of sacrificial wear element 600 is slightly larger than the nominal inside diameter of sacrificial wear element 600. Further, the diameter at chamfer 602 is advantageously larger than the diameter of holes 210 in bottom plate 180. Arranging the inside diameters in this fashion helps reduce clogging of granular material inside sacrificial wear element 600.

Still referring to FIG. 9A, in embodiments the inside diameter of tube 215 is tapered from a first relatively larger inside diameter 604 at the lower end of tube 215 to a second relatively smaller inside diameter 606 at the upper end of tube 215. In this manner, tube 215 functions as a funnel for the granular material that is moved through tube 215 as described in greater detail with respect to FIGS. 10-14. The funneling function minimizes clogging of granular material in tube 215.

As depicted in FIG. 9A, in embodiments each tube 215 is urged toward the bottom plate 180 by a resilient member such as a spring 608. A first end of spring 608 abuts an internal portion of tube carrier 220, and a second end of spring 608 abuts an external portion (e.g., shoulder) of tube 215. In this manner, sacrificial wear elements 600 are urged into contact with the top surface of bottom plate 180 to minimize clogging of granular material between sacrificial wear elements 600 and bottom plate 180.

In implementations, each downwardly depending leg of tube carrier 220 includes a bushing 610 that surrounds and contacts an outer surface of a tube 215. The bushing 610 facilitates smooth movement of tube 215 in a vertical direction relative to the downwardly depending leg of tube carrier 220. The bushing 610 may be composed of any suitable material, such as plastic. A seal 612 may also be provided in tube carrier 220 around the top end of each tube 215. The seal 612 prevents granular material from entering the hollow portion of the downwardly depending leg of tube carrier 220.

With continued reference to FIG. 9A, a fitting 614 may be used to connected the top end of each tube 215 to a respective conduit 225 (e.g. the conduit 225 described with respect to FIGS. 1 and 8). In embodiments, fitting 614 is a push-loc fitting that frictionally holds an end of conduit 225 in direct abutment with the upper end of tube 215. In implementations the push-loc style fitting 614 is preferred over a screw-type clamp fitting because a screw-type clamp fitting may result in unintentional deformation of conduit 225 and/or tube 215, which may lead to clogging of granular material therein. Moreover, the end-to-end abutment of conduit 225 and tube 215 provided by fitting 614 advantageously reduces clogging of granular material inside tube 215 by eliminating an internal shoulder in the vicinity of conduit 225 and tube 215.

In embodiments, conduit 225 has a nominal inside diameter that is substantially equal to the inside diameter 606 at the upper end of tube 215. Additionally, the lower end of conduit 225 may have an internal chamfer 616 such that the inside diameter at the lower end of conduit 225 is slightly larger than the nominal inside diameter of conduit 225. Arranging the inside diameters in this fashion helps reduce clogging of granular material at the connection between conduit 225 and tube 215.

Figure 9B:
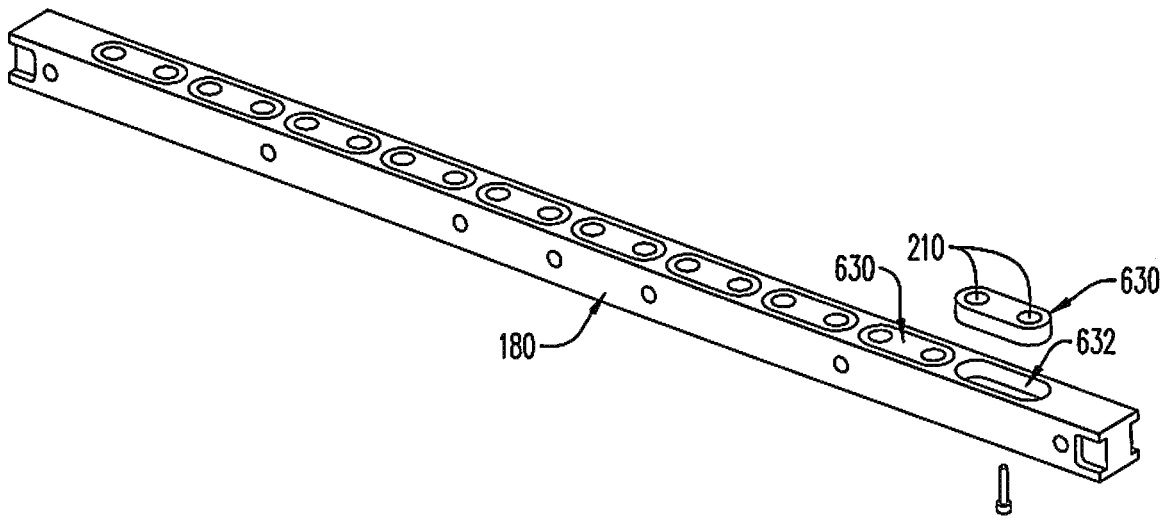

FIG. 9B shows an exemplary arrangement of bottom plate 180 of hopper 40 in accordance with aspects described herein. In embodiments, sacrificial wear elements 630 are arranged in cavities 632 in the top surface of bottom plate 180. The holes 210 (as shown in FIGS. 6, 8, 9A, and 10-14) may be provided in sacrificial wear elements 630. The sacrificial wear elements 630 may be the same material as sacrificial wear element 600 (shown in FIG. 9A), such as polyether ether ketone (PEEK). The sacrificial wear elements 630 may be held in cavities 632 by a fastener 634, such as a threaded screw or bolt. The sacrificial wear elements 630 may be individually removed and replaced on an as-needed basis during maintenance of system 10.

FIGS. 10-12 show an exemplary operation of measuring a portion of granular material using measuring system 50 as described herein. As shown in FIG. 10, in embodiments a pin 235 is arranged within hole 210 in bottom plate 180. An uppermost portion of pin 235 is situated within hole 210 (e.g., recessed from a surface of bottom plate 180), such that a cavity 240 is defined in hole 210 by bottom plate 180 and pin 235. Cavity 240 may also be referred to herein as a measuring cavity. The volume of cavity 240 may be selectively adjusted (e.g., increased or decreased) by moving pin 235 up or down within hole 210, as described in greater detail herein.

Still referring to FIG. 10, tube 215 is over bottom plate 180 and is moveable (e.g., slidable) back and forth relative to bottom plate 180 in the directions indicated by arrow 205. In embodiments, sacrificial wear element 600 is connected to lower end of the tube 215 and directly contacts bottom plate 180. Alternatively, bottom plate 180 may be provided with sacrificial wear elements 630 as shown in FIG. 9B, in which case sacrificial wear element 600 directly contact one of the sacrificial wear elements 630. As described with respect to FIG. 9A, an inside diameter of chamfer 602 of the sacrificial wear element 600 is slightly larger than the inside diameter of hole 210 to account for any slight misalignment of tube 215 and hole 210. Although not shown in FIG. 10, an upper end of tube 215 is connected to conduit 225, such that the hollow interiors of tube 215 and conduit 225 combine to form a flow path extending from measuring system 50 to pouch making machine 60, e.g., in the manner described with respect to FIG. 9A. The movement of tube 215 in the direction of arrow 205 may be effectuated via slide 200 as described with respect to FIG. 8, e.g., by connecting tube 215 to tube carrier 220 that is connected to slide 200. In the position shown in FIG. 10, tube 215 is beside (e.g., not covering) hole 210, which permits granular material 245 in hopper cavity 190 to move into cavity 240 by gravity and vacuum.

In embodiments, pin 235 has a hollow axial bore 250. A screen 247 may be provided at a first end of bore 250 (e.g., adjacent cavity 240) to prevent granular material 245 from entering bore 250. In aspects, a second end of bore 250 is fluidically connected to manifold 500. The manifold 500 may define a flow path 700 between one of the manifold vacuum ports 515 and second end of bore 250 for communicating a vacuum to bore 250. A valve 702 may be arranged in flow path 700 for selectively opening and closing flow path 700. The manifold 500 may also define a flow path 704 between one of the pressurized gas ports 525 and second end of bore 250 for communicating pressurized gas to bore 250. A valve 706 may be arranged in flow path 704 for selectively opening and closing flow path 704. A controller "C", such as a programmable computer device or the like, may be operatively connected to valves 702 and 706 to selectively apply vacuum or pressurized gas (e.g., compressed air) to bore 250. Controller "C" shown in FIGS. 10-12 may be the same as controller "C" shown in FIGS. 1 and 2, or may be a different controller. With continued reference to FIG. 10, cavity 240 is filled with granular material 245 when tube 215 is moved to a position to the side of hole 210 (e.g., not covering hole 210). In this position, some of the granular material 245 in hopper cavity 190 falls into cavity 240 by gravity. In embodiments, controller "C" maintains valve 702 in an open state and valve 706 in a closed state, which applies a vacuum to bore 250 (e.g., negative pressure indicated by downward arrow shown in bore 250), which aids in moving granular material 245 from hopper cavity 190 into cavity 240.

As shown in FIG. 11, after cavity 240 is filled with granular material 245, tube 215 is moved laterally within hopper cavity 190 such that sacrificial wear element 600 is slid along plate 180 to a position over and aligned with cavity 240. In particular, the hollow interior of tube 215 is substantially vertically aligned with hole 210 and cavity 240. Movement of tube 215 in the direction of arrow 275 pushes excess granular material 245 away from the space immediately over cavity 240, which provides a trimming action similar to dragging a knife across the top of a measuring cup that is overfilled with material. In this manner, implementations of the invention precisely measure a portion of granular material 245 in cavity 240. In embodiments, valve 702 is held open and valve 706 is held closed to continuously apply vacuum to bore 250 while tube 215 moves from the position shown in FIG. 10 to the position shown in FIG. 11.

As shown in FIG. 12, while tube 215 is in the aligned position over cavity 240, controller "C" maintains valve 702 open and additionally opens valve 706. This applies pressurized gas (e.g., compressed air) to bore 250 (e.g., as indicated by upward arrow shown in bore 250), which pushes the measured portion of granular material 245 out of cavity 240, through tube 215 and conduit 225 (as shown in FIG. 8), and into pouch making machine 60 (as shown in FIG. 8). In embodiments, controller "C" opens valve 706 for a predetermined amount of time that is sufficient to move the measured portion of granular material 245 from cavity 240 to the pouch making machine. After the predetermined amount of time, controller "C" closes valve 706, and tube 215 moves back to the position shown in FIG. 10 to repeat the cycle.

As described herein, system 10 may be operated such that valve 702 is maintained open to continuously apply vacuum to bore 250 throughout the entire cycle depicted in FIGS. 10-12, and further such that valve 706 is intermittently opened and closed to intermittently apply pressurized gas to bore 250 to overcome the vacuum. The pressurized gas is supplied at a pressure that is sufficient to overcome the vacuum at bore 250 to expel the granular material from cavity 240 and into tube 215. In an exemplary implementation, the vacuum supplied by accumulator 505 (shown in FIG. 8) may be in the range of 5 to 10 inches of mercury and the pressurized gas supplied at port 525 may be in a range of 40 to 55 psi, although any suitable values nay be used. Maintaining valve 702 in the open state to continuously apply vacuum to bore 250, while intermittently applying pressurized gas to eject the granular material, permits faster cycle time for the system 10 compared to turning the vacuum on and off during each cycle. For example, the system 10 described with respect to FIGS. 10-12 may be operated at 150 cycles per minute.

In additional embodiments, a fluid (e.g., water) may be injected into bore 250 while valve 706 is open as described in FIG. 12. The fluid may be injected into plumbing downstream of port 225, or alternatively may be injected at a separate port of pin 235. For example, an atomized water source 273 may be provided to inject atomized water into bore 250. The timing of the fluid injection may be optimized based on parameters including, but not limited to: duration of applying pressurized gas to bore 250 (e.g., the predetermined amount of time described with respect to FIG. 12); pressure of pressurized gas; and volume of cavity 240. In a preferred embodiment, the fluid injection occurs nearer the beginning of the duration of applying pressurized gas than the end.

With continued reference to FIGS. 10-12, the volume of cavity 240 may be adjusted by moving pin 235 up or down within hole 210. For example, moving pin 235 upward in hole 210 makes cavity 240 smaller, and moving pin downward in hole 210 makes cavity 240 larger. The pin 235 may be moved up or down in hole 210 using any suitable actuator, such as a manual and/or automated screw actuator or the like.

In accordance with aspects described herein, the volume of cavity 240 is adjusted based on a determined weight of a number of pouches that are produced by the pouch making machine 60. For example, a number of pouches may be made by pouch making machine 60, with each pouch including a portion of granular material that is measured using cavity 240. The number of pouches may be weighed, the weight of the number of pouches may be compared to an upper threshold and a lower threshold, and the volume of cavity 240 may be adjusted based on comparing the determined weight to the upper and lower thresholds. For example, when the determined weight is less than the lower threshold, then pin 235 is moved downward in hole 245, thereby making cavity 240 larger and increasing the mass of granular material per pouch. When the determined weight is more than the upper threshold, then pin 235 is moved upward in hole 245, thereby making cavity 240 smaller and decreasing the mass of granular material per pouch. When the determined weight is between the lower threshold and upper threshold, the pin 235 is kept at its current position in hole 210, as this indicates the pouches are meeting a target weight. In this manner, implementations of the invention provide a feedback loop for adjusting the volume of cavity 240, which adjusts the mass of granular material in each pouch that is produced using cavity 240.

As described herein, system 10 may include plural lanes simultaneously making pouches filled with granular material. For example, as shown in FIGS. 1 and 8, there may be ten lanes L1-L10, although the invention is not limited to this number and any desired number of lanes may be used. Each lane may include: at least one hole 210 with an associated cavity 240 and pin 235; a tube 215; and a conduit 225. When plural lanes are used, the volume of each respective cavity 240 may be individually adjusted based on determined weight of the pouches produced in that particular lane as already described herein. For example, with reference to FIG. 1, a conveyor system 70 may be structured and arranged to simultaneously move plural empty containers 80 into alignment with the plural lanes at the output of pouch making machine 60, such that the respective containers 80 are simultaneously filled with pouches from respective ones of the lanes. The position of each container 80 may be tracked throughout the entire system, and each container 80 may be associated with the particular one of the lanes from which it was filled. Each container 80 may be weighed after being filled, and the volume of cavity 240 in the lane associated with the weighed container 80 may be adjusted based on the weight of the container 80 independent of the cavities 240 of the other lanes.

FIGS. 13 and 14 show an exemplary operation of measuring system 50' in which each lane includes one tube 215, two holes 210a and 210b, two pins 235a and 235b, and two cavities 240a and 240b. As shown in FIGS. 13 and 14, tube 215 moves back and forth to positions aligned over the respective holes 210a and 210b. When tube 215 is aligned over hole 210a, as shown in FIG. 13, the measured portion of granular material in cavity 240a is expelled from cavity 240a through tube 215 by applying pressurized gas (e.g., compressed air) to bore 250a of pin 235a, e.g., in a manner similar to that described with respect to FIG. 12. Also when tube 215 is aligned over hole 210a, as shown in FIG. 13, hole 210b is uncovered and cavity 240b fills with granular material from hopper cavity 190, e.g., in a manner similar to that described with respect to FIG. 10.

FIG. 14 depicts tube 215 moved to a position over and aligned with hole 210b, e.g., after the operation shown in FIG. 13. As shown in FIG. 14, when tube is over hole 210b, the measured portion of granular material in cavity 240b is expelled from cavity 240b through tube 215 by applying pressurized gas (e.g., compressed air) to bore 250b of pin 235b, and cavity 240a fills with granular material from hopper cavity 190. After the operation shown in FIG. 14, tube 215 moves back to the position shown in FIG. 13 and the cycle repeats.

In embodiments, continuously applied vacuum may be used to assist filling cavities 240a and 240b in a manner similar to that described with respect to FIG. 10. Moreover, each respective pin 235a-b may be individually connected to a respective vacuum port 515a-b of manifold 500. In this manner, vacuum is consistently applied at substantial the same level at each bore 250a-b. For example, in the position shown in FIG. 13, valves 702a and 702b are maintained continuously open, valve 706b is closed, and valve 706a is opened for a predetermined amount of time. The vacuum remains continuously applied to both bores 235a and 235b while tube 215 moves from the position shown in FIG. 13 to the position shown in FIG. 14. When tube 215 is aligned over hole 210b, valves 702a and 702b are maintained continuously open, valve 706a is closed, and valve 706b is opened for a predetermined amount of time.

Figure 15:
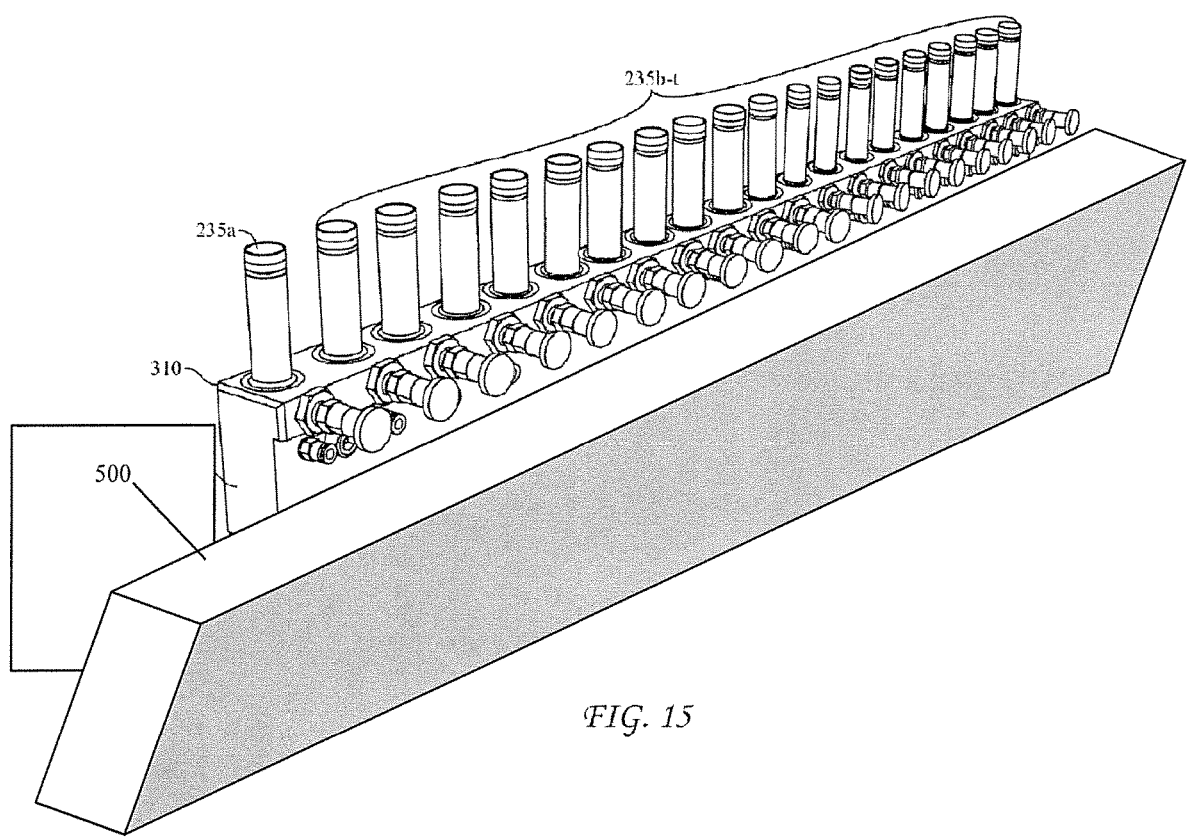
FIG. 15 shows additional aspects of the pouch making system, in accordance herewith.

FIG. 15 shows portions of an exemplary measuring system 50 including twenty pins 235a-t, which may be used in a ten lane system such as that shown in FIGS. 1, 6, and 8. In embodiments, each respective pin 235a-t is connected to manifold 500 in the manner shown in FIGS. 10-14. Structure 310 may house all the valves associated with all the respective pins 235a-t. Structure 310 may additionally or alternatively house manual and/or automated mechanisms for adjusting the height of pins 235a-t to adjust cavity volumes as described herein, either individually or as a group.

The system as described herein may thus include ten lanes, with each lane including one tube 215, one conduit 225, two holes 210a and 210b, two cavities 240a and 240b, and two pins 235a and 235b. All ten tubes and conduits may be moved as a group in a reciprocating fashion, e.g., as shown in FIG. 8, between a first position over a first ten holes and a second position over a second ten holes. When the ten tubes are in the first position over the first ten holes, a first ten measured portions of granular material are moved from a first ten cavities to the pouch making machine, while a second ten cavities are simultaneously filled with granular material from the hopper cavity. When the ten tubes are in the second position over the second ten holes, a second ten measured portions of granular material are moved from a second ten cavities to the pouch making machine, while the first ten cavities are simultaneously filled with granular material from the hopper cavity.

In embodiments, a level sensor may be used to maintain a proper level of granular material in hopper cavity 190. For example, a laser sensor, electronic eye, or the like, may be used to detect when the amount of granular material in hopper cavity 190 falls below a predefined threshold. Any desired number and/or type(s) of level sensors may be used. A controller may be connected to the level sensor. The controller connected to the level sensor may be the same as controller "C" shown in FIGS. 1 and 2, or may be a different controller. When the level sensor detects the amount of granular material in hopper cavity 190 falls below a predefined threshold, the controller may activate the sifter 30 for a predefined amount of sifting time (e.g., 2 seconds) to move granular material from the sifter 30 to the hopper 40. Activating the sifter 30 may include, for example, the controller sending a signal to electric motor 155 to cause rotation of shaft 150 that moves wipers 145 for the predefined amount of sifting time.

After the predefined amount of sifting time, in the event the level sensor indicates the level of granular material in hopper 40 is above the predefined threshold, then the controller turns off sifter 30. On the other hand, in the event the level sensor indicates the level of granular material in hopper 40 is still below the predefined threshold after the predefined amount of sifting time, then the controller causes the system to agitate feeder 20 for a predefined amount of feeder time to move granular material from feeder 20 to sifter 30. Agitating feeder 20 may include, for example, the controller sending a signal to actuators 139a-c that cause vibration of pans 110a-c of feeder 20 for the predefined amount of feeder time, which causes granular material to move from feeder 20 into sifter 30. In aspects, the controller also activates sifter 30 while agitating feeder 20.

After the predefined amount of feeder time, in the event the level sensor indicates the level of granular material in hopper 40 is above the predefined threshold, then the controller turns off feeder 20 and sifter 30. On the other hand, in the event the level sensor indicates the level of granular material in hopper 40 is still below the predefined threshold after the predefined amount of sifting time, then the controller causes the system to agitate feeder 20 and activate sifter 30 again for the predefined amount of feeder time. In this manner, the system may keep feeder 20 and sifter 30 turned on until the level of granular material in hopper 40 reaches the desired level.

As described herein, various aspects of system 10 may be controlled using a controller, such as a programmable computer device or the like. For example, controller "C" may be operatively connected to elements of system 10 and adapted to control at least one of the following functions: detecting level of granular material in chambers of sifter 30; detecting level of granular material in hopper 40; agitating lanes of feeder 20; moving wipers 145 in sifter 30; moving slide 200; controlling valves 702 and 706; moving conveyor 70; tracking positions of containers 80 on conveyor 70 and/or throughout the system; weighing pouches in containers and comparing the weight to thresholds; and adjusting height of pins 235 in holes 210 based on the comparing. For example, controller "C" may be configured to coordinate the timing of the movement of slide 200 with the control of valves 702 and 706, such that vacuum is continuously applied and pressure is intermittently applied to bore 250 based on the position of tube 215 over cavity 240 (e.g., as described with respect to FIGS. 10-14). The invention is not limited to a single controller performing these functions, and any desired number and/or type of controllers may be used. The controller(s) may be operatively connected to sensors and/or actuators, e.g., as described herein, in order to perform one or more of these functions.

Figure 16:
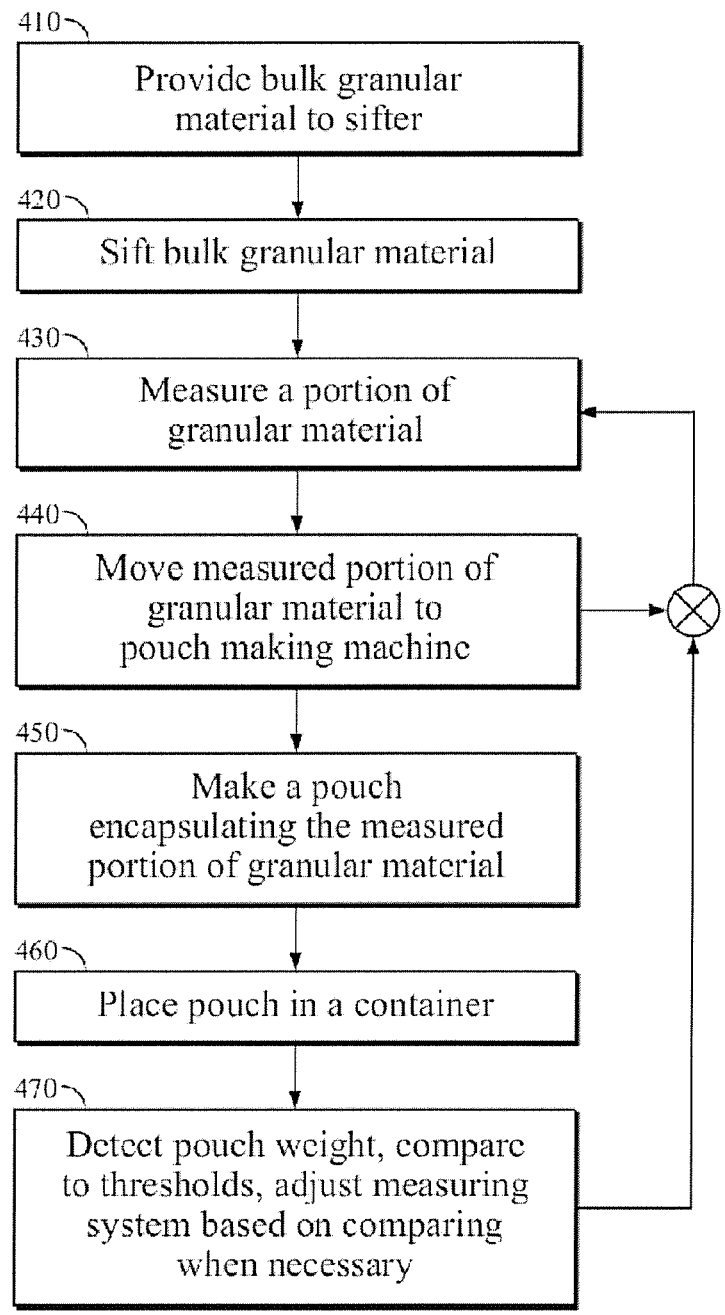
FIG. 16 shows a flow diagram of a method in accordance herewith.

FIG. 16 shows a flow diagram of a method in accordance herewith. Methods in accordance herewith may be performed using the systems described with respect to FIGS. 1-15 and in a manner similar to that described with respect to those figures. The steps of FIG. 16 are described in part by referring to reference numbers associated with elements shown in the previous drawings. At step 410 the system provides bulk granular material (e.g., tobacco), e.g., to sifter 30. This may comprise, for example, providing bulk granular material to feeder 20 and/or agitating feeder 20 to cause the bulk granular material to fall out of feeder 20 into sifter 30.

At step 420, the system sifts the bulk granular material. In embodiments, this includes sifting the bulk granular material through screens 140 in sifter 145. This may optionally include moving wipers 145 to assist in sifting the bulk granular material through screens 140.

At step 430, the system measures a portion of the sifted granular material. In embodiments, the measuring includes moving a portion of the granular material from the hopper cavity 190 to a measuring cavity 240, e.g., as described with respect to FIGS. 10-14. Step 430 may include uncovering a cavity 240 and moving granular material 245 into the cavity 240 by gravity and continuously applied vacuum (e.g., as in FIG. 10), and trimming excess granular material 245 away from over the cavity (e.g., as in FIG. 11).

At step 440, the system moves the measured portion of granular material to a pouch making machine. This may include ejecting the measured portion of granular material from the measuring cavity 240 using compressed air, which causes the measured portion of granular material to travel through tube 215 and conduit 225 to pouch making machine 60.

At step 450, the system makes a pouch encapsulating the measured portion of granular material. This may include, for example, pouch making machine 60 forming a pouch using conventional pouch making processes. At step 460, the system places the pouch in a container, e.g., container 80.

After step 440, one branch of the process loops back to step 430. In this manner, the system continues to measure new portions of the granular material concurrently while the pouch making machine is processing previous measured portions of granular material.

At optional step 470, the system detects the weight of one or more pouches, compares the weight to upper and lower thresholds, and adjusts the measuring system based on the comparing, if necessary. Step 470 may include one of: moving pin 235 downward in hole 245, thereby making cavity 240 larger and increasing the mass of granular material per pouch, when the determined weight is less than the lower threshold; moving pin 235 upward in hole 245, thereby making cavity 240 smaller and decreasing the mass of granular material per pouch, when the determined weight is more than the upper threshold; and not moving pin 235 when the determined weight is between the lower threshold and upper threshold. After step 470, the process returns to step 430 to continue measuring portions of the granular material.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

INDUSTRIAL APPLICABILITY

The systems and methods disclosed herein are applicable to the packaging industry, in particular, to that portion directed to pouching, and to the tobacco industry, in particular that portion directed to smokeless tobacco products.

The particulars shown herein are by way of example and for purposes of illustrative discussion only and are presented in the cause of providing what is believed to be the most useful and readily understood description of the principles and conceptual aspects. In this regard, no attempt is made to show structural details in more detail than is necessary for fundamental understanding, the description taken with the drawings making apparent to those skilled in the art how the several forms disclosed herein may be embodied in practice.

It is noted that the foregoing examples have been provided merely for the purpose of explanation and are in no way to be construed as limiting. While aspects have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects have been described herein with reference to particular means, materials, and/or embodiments, the present disclosure is not intended to be limited to the particulars disclosed herein; rather, it extends to all functionally equivalent structures, methods and uses, such as are within the scope of the appended claims.

What is claimed:

1. A system for measuring tobacco for packaging in pouches, the system comprising:
a hopper including a hopper cavity configured to hold a granular material; and
a measuring system including a measuring cavity and a tube that is slidable in the hopper cavity between a first position unaligned with the measuring cavity and a second position over and aligned with the measuring cavity, the measuring system including,
a first valve disposed between a vacuum source and the measuring cavity, the first valve being configured to selectively place the vacuum source in fluid communication with the measuring cavity, and
a second valve disposed between a pressurized gas source and the measuring cavity, the second valve being configured to selectively place the pressurized gas source in fluid communication with the measuring cavity independent of a position of the first valve, wherein the first valve is configured to continuously communicate a vacuum to the measuring cavity,
the measuring system configured to move a portion of the granular material from the hopper cavity to the measuring cavity when the tube is in the first position, and
the measuring system configured to move the portion of the granular material from the measuring cavity, through the tube, to a pouch making machine by operating the second valve to supply pressurized gas that overcomes the vacuum when the tube is in the second position.

2. The system of claim 1, further comprising:
a conduit connected to the tube, the tube and the conduit defining a flow path between the measuring cavity and the pouch making machine when the tube is in the second position.

3. The system of claim 1, wherein the measuring cavity is in a bottom plate of the hopper.

4. The system of claim 1, wherein
the measuring system includes a pin having a bore in fluid communication with the measuring cavity,
a location of the pin within a hole defines a volume of the measuring cavity, and
the location of the pin within the hole is adjustable to selectively adjust the volume of the measuring cavity.

5. The system of claim 4, further comprising:
a controller configured to
receive a weight of at least one pouch made by the pouch making machine with the granular material from the measuring cavity;
compare the weight to an upper threshold and a lower threshold; and
change the location of the pin in the hole based on the weight.

6. The system of claim 1, further comprising:
a wear element connected to an end of the tube and contacting a plate that defines the measuring cavity.

7. The system of claim 6, wherein the tube is biased toward the plate that defines the measuring cavity.

8. The system of claim 1, wherein the tube has a continuously tapered inside diameter.

9. The system of claim 1, wherein
the tube is supported by a slide that causes the tube to move in a reciprocating manner between the first position and the second position; and
the hopper comprises moveable end blocks connected to the slide.

10. The system of claim 1, further comprising:
a sifter configured to sift the granular material, the sifter including a compartment having a screen and a moveable wiper, the granular material moving through the screen to the hopper;
a feeder configured to provide the granular material to the sifter;
a level sensor in the hopper; and a controller configured to move the moveable wiper in the sifter, agitate the feeder, or move the moveable wiper in the sifter and agitate the feeder based on a signal from the level sensor.

11. The system of claim 1, further comprising:
a feeder configured to provide the granular material to a sifter, the feeder including a number of lanes and the sifter including a number of compartments corresponding to the number of lanes;
a respective level sensor in each of the compartments of the sifter; and
a controller configured to individually control agitation of the respective lanes of the feeder based on signals from the respective level sensors.

12. The system of claim 1, further comprising:
a manifold connected to the measuring system, the manifold configured to communicate the vacuum source to the first valve and the pressurized gas source to the measuring cavity.

13. The system of claim 12, further comprising:
an accumulator connected between the manifold and the vacuum source.

14. The system of claim 13, wherein
the measuring system includes a plurality of the measuring cavities,
the first valve includes a plurality of first valves, the plurality of first valves being disposed between the vacuum source and the plurality of the measuring cavities, respectively,
the second valve includes a plurality of second valves, the plurality of second valves being disposed between the pressurized gas source and the plurality of measuring cavities, respectively,
the manifold includes a plurality of manifold ports fluidly connected to the plurality of the measuring cavities, and
the accumulator includes a plurality of accumulator ports fluidly connected to the plurality of manifold ports.

15. A system for measuring tobacco for packaging in pouches, the system comprising:
a hopper having a hopper cavity configured to hold a granular material; and
a measuring system including,
a plurality of measuring cavities
a plurality of tubes slidable in the hopper cavity,
a plurality of first valves disposed between a vacuum source and the plurality of measuring cavities, respectively, the plurality of first valves being configured to selectively place the vacuum source in fluid communication with the plurality of measuring cavities, and
a plurality of second valves disposed between a pressurized gas source and the plurality of measuring cavities, respectively, the plurality of second valves being configured to selectively place the pressurized gas source in fluid communication with the plurality of measuring cavities, wherein
the measuring system is configured to
continuously communicate a vacuum to each of the plurality of measuring cavities,
move the plurality of tubes to a first position that uncovers the plurality of measuring cavities,
fill the plurality of measuring cavities with respective portions of the granular material using the vacuum while the plurality of tubes are in the first position,
move the plurality of tubes to a second position over and aligned with the plurality of measuring cavities, and
move the respective portions of the granular material from the plurality of measuring cavities, through the plurality of tubes, respectively, to a pouch making machine using pressurized gas that overcomes the vacuum while the plurality of tubes are in the second position.

16. The system of claim 15, wherein
the plurality of measuring cavities is a first plurality of measuring cavities,
the measuring system includes a second plurality of measuring cavities different from the first plurality of measuring cavities,
the plurality of tubes are over and aligned with the second plurality of measuring cavities in the first position,
the measuring system is configured to fill the second plurality of measuring cavities with second respective portions of the granular material while the plurality of tubes are in the second position, and
the measuring system is configured to move the second respective portions of the granular material from the second plurality of measuring cavities to the pouch making machine while the plurality of tubes are in the first position.

17. The system of claim 15, wherein
the plurality of tubes are supported by a slide that is configured to move the plurality of tubes in a reciprocating manner between the first position and the second position, and
the hopper includes moveable end blocks connected to the slide.

18. The system of claim 15, wherein each of the plurality of measuring cavities has a volume that is selectively adjustable.

19. The system of claim 15, further comprising:
a sifter configured to sift the granular material into the hopper;
a feeder configured to provide the granular material to the sifter;
a level sensor in at least one of the sifter and the hopper; and
a controller configured to agitate the feeder based on a signal from the level sensor.

* * * * *